(12) United States Patent
Yamaguchi et al.

(10) Patent No.: US 6,607,682 B1
(45) Date of Patent: Aug. 19, 2003

(54) PRE-EXPANDED POLYPROPYLENE RESIN BEADS AND PROCESS FOR PRODUCING MOLDED OBJECT THEREFROM BY IN-MOLD FOAMING

(75) Inventors: Takema Yamaguchi, Akashi (JP); Tomonori Iwamoto, Kobe (JP); Minori Yamaguchi, Akashi (JP); Kenichi Senda, Hirakata (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/509,502

(22) PCT Filed: Jul. 22, 1999

(86) PCT No.: PCT/JP99/03916

§ 371 (c)(1),
(2), (4) Date: Mar. 29, 2000

(87) PCT Pub. No.: WO00/06636

PCT Pub. Date: Feb. 10, 2000

(30) Foreign Application Priority Data

Jul. 30, 1998 (JP) .............................. 10-215510

(51) Int. Cl.$^7$ .............................. B29C 44/02
(52) U.S. Cl. ........................ 264/51; 264/126
(58) Field of Search ............... 264/51, 55, 126; 521/56, 60

(56) References Cited

U.S. PATENT DOCUMENTS

| | | | |
|---|---|---|---|
| 3,770,663 A | | 11/1973 | Ueki et al. |
| 3,893,989 A | * | 7/1975 | Leicht et al. .................. 526/73 |
| 4,422,877 A | | 12/1983 | Spitzer et al. |
| 4,483,809 A | * | 11/1984 | Ando et al. .................... 264/53 |
| 4,506,037 A | | 3/1985 | Suzuki et al. |

(List continued on next page.)

FOREIGN PATENT DOCUMENTS

| | | |
|---|---|---|
| DE | 3538477 | 5/1986 |
| DE | 35 38 477 | 5/1986 |
| DE | 42 35 747 | 6/1994 |
| EP | 0 224 265 | 6/1987 |
| EP | 0 409 788 | 1/1991 |
| EP | 0 464 788 | 1/1992 |
| EP | 0 524 404 | 1/1993 |
| EP | 0 693 528 | 1/1996 |

(List continued on next page.)

OTHER PUBLICATIONS

U.S. patent application Ser. No. 09/155,544, Mogami et al., filed Sep. 25, 1998.

*Primary Examiner*—Allan R. Kuhns
(74) *Attorney, Agent, or Firm*—Leydig, Voit & Mayer, Ltd.

(57) ABSTRACT

Polypropylene resin pre-expanded particles having an expandability of 1.0 to 1.8 shown by the equation:

$$\text{Expandability} = \frac{\text{Expansion ratio of polypropylene resin pre-expanded particles after steam heating}}{\text{Expansion ratio of polypropylene resin pre-expanded particles before steam heating}}$$

wherein the expansion ratio of polypropylene resin pre-expanded particles after steam heating denotes the value obtained when heating the pre-expanded particles by steam having a temperature equal to the melting point peak temperature measured by differential scanning calorimetry of the base resin constituting the particles, the pre-expanded particles being able to be molded by various in-mold foaming methods in a shortened period of cooling time in molding to stably produce cellular molded articles having good melt adhesion of the particles and surface appearance and having uniform density in the surface and inner portions.

4 Claims, 1 Drawing Sheet

U.S. PATENT DOCUMENTS

| | | | |
|---|---|---|---|
| 4,587,270 A | 5/1986 | Kuwabara et al. | |
| 4,617,323 A | 10/1986 | Kuwabara et al. | |
| 4,626,555 A | 12/1986 | Endo et al. | |
| 4,676,939 A | 6/1987 | Kuwabara | |
| 4,689,351 A | 8/1987 | Endo et al. | |
| 4,695,593 A | 9/1987 | Kuwabara et al. | |
| 4,720,509 A | 1/1988 | Nakamura | |
| 4,761,431 A | 8/1988 | Nakamura | |
| 4,777,000 A | 10/1988 | Kuwabara et al. | |
| 4,830,798 A | 5/1989 | Maeda | |
| 4,840,973 A | 6/1989 | Kuwabara et al. | |
| 4,948,817 A | 8/1990 | Kuwabara et al. | |
| 5,053,435 A | 10/1991 | Kuwabara et al. | |
| 5,071,883 A | 12/1991 | Kuwabara et al. | |
| 5,229,049 A | 7/1993 | Maeda | |
| 5,459,169 A | 10/1995 | Tokoro et al. | |
| 5,693,424 A | 12/1997 | Watanabe et al. | |
| 5,744,505 A | 4/1998 | Fischer et al. | |
| 5,747,549 A | 5/1998 | Tsurugai et al. | |
| 5,830,922 A * | 11/1998 | Wirobski et al. | 264/55 |
| 5,883,141 A | 3/1999 | Mihayashi et al. | |
| 5,968,430 A * | 10/1999 | Naito et al. | 264/51 |
| 6,013,687 A | 1/2000 | Wirobski et al. | |
| 6,051,617 A | 4/2000 | Sasaki et al. | |
| 6,077,875 A * | 6/2000 | Sasaki et al. | 521/56 |
| 6,355,696 B1 | 3/2002 | Yamaguchi et al. | |

FOREIGN PATENT DOCUMENTS

| | | |
|---|---|---|
| EP | 0 775 722 | 5/1997 |
| EP | 0 775 772 | 5/1997 |
| JP | 49-2183 | 1/1974 |
| JP | 52-77174 | 6/1977 |
| JP | 57-170725 | 10/1982 |
| JP | 58-62024 | 4/1983 |
| JP | 60-90228 | 5/1985 |
| JP | 60-188435 | 9/1985 |
| JP | 60-221440 | 11/1985 |
| JP | 61-4738 | 1/1986 |
| JP | 62-115042 | 5/1987 |
| JP | 3-254930 | 11/1991 |
| JP | 4-331247 | 11/1992 |
| JP | 7-138399 | 5/1995 |
| JP | 8-20662 | 1/1996 |

* cited by examiner

FIG. 1

PRE-EXPANDED POLYPROPYLENE RESIN BEADS AND PROCESS FOR PRODUCING MOLDED OBJECT THEREFROM BY IN-MOLD FOAMING

TECHNICAL FIELD

The present invention relates to pre-expanded particles of a polypropylene resin suitable for the production of thermal insulation materials, cushioning packaging materials, returnable delivery boxes, automobile bumper cores and so on, and to a process for preparing polypropylene resin in-mold foamed articles from the pre-expanded particles.

BACKGROUND ART

Polypropylene in-mold foaming products are superior in chemical resistance, heat resistance and distortion restoration rate after compression as compared to polystyrene in-mold foaming products. They are also superior in heat resistance and compression strength as compared to polyethylene in-mold foaming products. For these reasons they are widely used as cushioning packaging materials, returnable delivery boxes, automobile bumper cores, and others.

In recent years, efforts to improve productivity are being made for the purpose of reducing the cost of industrial products in a wide range of fields, e.g., in the production of molded articles by shortening the molding time. It is strongly demanded to shorten the molding time also in the production of polypropylene in-mold foamed articles to reduce costs.

Various techniques for shortening the molding time are known in the production of in-mold foamed articles from polypropylene resin pre-expanded particles.

For example, Japanese Patent Publication Kokai No. 61-103944 discloses a process of the production of in-mold foamed articles using expanded particles of a non-crosslinked polypropylene having a density of 8 to 100 g/liter and a particle diameter of 1 to 5 mm and containing 0.02 to 1 part by weight of organic sodium phosphate per 100 parts by weight of the polypropylene. However, this process requires the incorporation of the phosphorus compound and, therefore, it may exert an unfavorable influence on environment and is also disadvantageous in cost. Further, when performing in-mold molding of the polypropylene expanded particles obtained, this process requires compressing the particles to 50%.

Japanese Patent Publication Kokai No. 8-20662 discloses a process for preparing molded articles wherein polypropylene resin 1 expanded particles exhibiting a high temperature side fusion peak, the heat of fusion of which is more than 3.5 cal/g and is not more than 6.0 cal/g, are compressed and filled in a mold in a compression rate of 10 to 60% and heated with steam to produce a molded article. In this process, however, the molding method is limited to only a specific method and there is a limit in shortening the molding time in general production of in-mold foamed articles.

It is an object of the present invention to provide pre-expanded particles of a polypropylene resin which can be molded in a mold in a shortened molding time to give cellular molded articles.

A further object of the present invention is to provide pre-expanded particles of a polypropylene resin which can be stably molded according to various known in-mold foaming methods in a shortened molding time under a wide rage of molding conditions to give cellular molded articles having excellent properties such as weldability of particles and surface appearance.

Another object of the present invention is to provide a process for stably preparing polypropylene resin in-mold foamed articles having excellent properties in a shortened molding time.

DISCLOSURE OF INVENTION

The present inventors have found, as a result of making intensive study in view of such circumstances, that when performing in-mold foaming by using polypropylene resin pre-expanded particles, the expandability of which measured when heated by steam of a temperature equal to the melting point peak temperature of the base resin thereof measured by differential scanning calorimetry (hereinafter also referred to as "DSC method") is controlled within a specific range, the cooling time in the in-mold foaming can be shortened, and also that when a difference between the expandability when heated by steam of the melting point peak temperature and the expandability when heated by steam of "the melting point peak temperature—10° C." is controlled to not more than a specific range, the cooling time can be shortened stably even if the molding conditions such as heating pressure of in-mold foaming are changed, and further that pre-expanded particles can be suitably used in various in-mold foaming methods.

Thus, in accordance with the present invention, there is provided a pre-expanded particle of a polypropylene resin, the expandability of which shown by the equation:

$$\text{Expandability} = \frac{\text{Expansion ratio of polypropylene resin pre-expanded particles after steam heating}}{\text{Expansion ratio of polypropylene resin pre-expanded particles before steam heating}}$$

wherein the expansion ratio of polypropylene pre-expanded particles after steam heating denotes the value measured after the restoration from shrinking by impregnating the pre-expanded particles with air, is from 1.0 to 1.8 when heating the pre-expanded particles by steam of a temperature equal to a melting point peak temperature of its base resin measured by differential scanning calorimetry in such a manner as heating 1 to 10 mg of the pre-expanded particles to 210° C. at a temperature elevation speed of 10° C./minute in a differential scanning calorimeter, then cooling to 40° C. at a temperature dropping speed of 10° C./minute and heating again to 210° C. at a temperature elevation speed of 10° C./minute.

It is preferable that the polypropylene resin pre-expanded particles are those showing a difference of at most 0.2 between the expandability obtained when heating the pre-expanded particles by steam of the melting point peak temperature of the base resin and the expandability obtained when heating the pre-expanded particles by steam of "the melting point peak temperature—10° C.".

The present invention also provides a process for preparing polypropylene resin in-mold foamed articles characterized by imparting an inner pressure to pre-expanded particles of a polypropylene resin, the expandability defined above of which is from 1.0 to 1.5 when heating the pre-expanded particles by steam of the melting point peak temperature of the base resin, filling the particles in a mold capable of being closed but incapable of being hermetically sealed, and heating the particles by steam to fuse together.

Further, the present invention provides a process for preparing polypropylene resin in-mold foamed articles characterized by filling pre-expanded particles of a polypropylene resin, the expandability defined above of which is from 1.0 to 1.5 when heating the pre-expanded particles by steam of the melting point peak temperature of the base resin, in a mold capable of being closed but incapable of being hermetically sealed so that the compression rate is from 10 to 60%, and heating the particles by steam to fuse together.

Further, the present invention provides a process for preparing polypropylene resin in-mold foamed articles characterized by filling pre-expanded particles of a polypropylene resin, the expandability defined above of which is from 1.5 to 1.8 when heating the pre-expanded particles by steam of the melting point peak temperature of the base resin, in a mold capable of being closed but incapable of being hermetically sealed without applying an inner pressure-imparting procedure to the pre-expanded particles, and heating the particles by steam to fuse together.

BEST MODE FOR CARRYING OUT THE INVENTION

The polypropylene resin pre-expanded particles of the present invention show an expandability of 1.0 to 1.8 when heating the particles by steam of a temperature equal to the melting point peak temperature measured by differential scanning calorimetry of the base resin of the particles, wherein the expandability is represented by the equation:

$$\text{Expandability} = \frac{\text{Expansion ratio of polypropylene resin pre-expanded particles after steam heating}}{\text{Expansion ratio of polypropylene resin pre-expanded particles before steam heating}}$$

If the expandability is less than 1.0, the pre-expanded particles do not sufficiently expand upon conducting in-mold foaming of the particles, thus resulting in insufficient melt-adhesion of the particles. Also, the obtained molded articles have a large dimensional shrinkability and such a surface appearance that gaps between the particles are noticeable in, the surface thereof, so no satisfactory molded articles are obtained. If the expandability is more than 1.8, satisfactory molded articles can be obtained, but the cooling time in molding becomes long since expandability exhibited at the time of molding becomes large.

The polypropylene resin pre-expanded particles are preferred to be those showing a difference of not more than 0.2 between the expandability obtained when heating the pre-expanded particles by steam of the melting point peak temperature of the base resin and the expandability obtained when heating the pre-expanded particles by steam of "the melting point peak temperature—10° C.". In case that the expandability difference is not more than 0.2, the molding time does not change largely even if the molding conditions of in-mold foaming of the pre-expanded particles such as heating pressure for molding, gas pressure to be imparted to the beads and compression rate applied upon filling the beads in a mold are changed, so the in-mold foamed articles can be stably obtained.

In case that the above-mentioned expandability of the polypropylene resin pre-expanded particles measured when heating the particles by steam of the melting point peak temperature of the base resin is from 1.0 to 1.5, preferably 1.0 to 1.3, molded articles satisfactory in melt adhesion of the particles and surface appearance of the molded articles can be obtained in a shortened cooling time in molding by a process of the preparation of in-mold foamed articles as mentioned after which comprises imparting an inner pressure to the pre-expanded particles prior to filling them in a mold, filling the particles in a mold capable of being closed but incapable of being hermetically sealed and heating the particles by steam to mold them, or which comprises filling the pre-expanded particles in a mold capable of being closed but incapable of being hermetically sealed in the state of being compressed in a compression rate of 10 to 60% and heating the particles by steam to mold them.

Also, in case that the above-mentioned expandability of the polypropylene resin pre-expanded particles measured when heating the particles by steam of the melting point peak temperature of the base resin is from 1.5 to 1.8, preferably 1.6 to 1.7, the polypropylene resin pre-expanded particles can be molded in a shortened cooling time in molding by a process of the preparation of in-mold foamed articles as mentioned after which comprises directly filling the pre-expanded particles in a mold capable of being closed but incapable of being hermetically sealed without performing an inner pressure-imparting procedure such as gas introduction, and heating the particles by steam to give molded articles satisfactory in melt adhesion of the particles and surface appearance of the molded articles.

As mentioned above, in the production of in-mold foamed articles, the moldings can be stably obtained in a shortened period of the cooling time in molding by regulating the above-mentioned expandability, which becomes an index of the secondary expansion force of polypropylene resin pre-expanded particles, within a specific range. Further, since the pre-expanded particles having the optimum expandability can be selected in various processes for preparing in-mold foamed articles, good melt-adhesion of the pre-expanded particles is achieved in the in-mold foaming and in-mold foamed articles having a good surface appearance and a uniform density extending from the surface portion to the inner portion can be obtained. It is assumed that since the pre-expanded particles have only the minimum expandability necessary to give a foamed article true to the mold and, therefore, since the inner pressure of the foamed article does not rise any more than necessary after heating the particles with steam or the like, the inner pressure dropping speed in the mold is high, so the molding time becomes short, and further since the difference in pressure between the surface portion and the inner portion of the molded article, the density becomes uniform extending from the surface to the inner portion of the molded article.

An explanation is given below with respect to the expandability when heating pre-expanded particles by steam of the melting point peak temperature measured by differential scanning calorimetry of the base resin of the particles.

The melting point peak temperature of the base resin measured by differential scanning calorimetry denotes the temperature of a peak showing the melting point in a DSC curve obtained using a differential scanning calorimeter with a sample of 1 to 10 mg of polypropylene resin pre-expanded particles under conditions of elevating the temperature to 210° C. at a temperature elevation speed of 10° C./minute, then cooling to 40° C. at a temperature dropping speed of 10° C./minute and elevating the temperature again to 210°

C. at a temperature elevation speed of 10° C./minute. From the viewpoint of the melt-adhesion of pre-expanded particles in in-mold foaming, it is preferable that the melting point peak temperature of the base resin in the polypropylene resin pre-expanded particles of the present invention is about 135° to about 160° C.

The differential scanning calorimeter used in the differential scanning calorimetry may be an ordinary differential scanning calorimeter such as model DSC-2 made by Perkin-Elmer or model SSC5200H made by Seiko Electronic Industries, Ltd.

Figure 1:
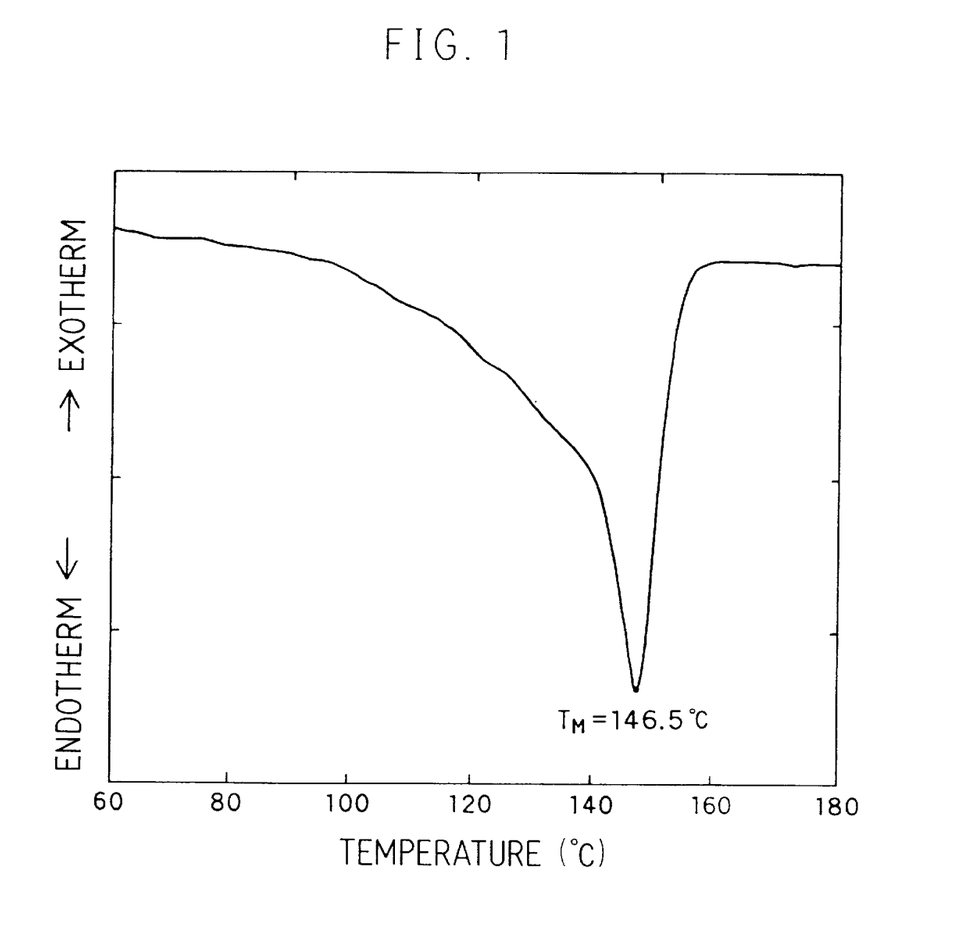
FIG. 1 is a view showing a DSC curve obtained when measuring the melting point peak of an ethylene-propylene random copolymer having an ethylene content of 2.1% by weight by differential scanning calorimetry.

As an example that the melting point peak temperature of a base resin has been obtained by the differential scanning calorimetry, in FIG. 1 is shown a DSC curve obtained when the melting point peak temperature was measured using an ethylene-propylene random copolymer having an ethylene content of 2.1% by weight as the polypropylene resin particles. In FIG. 1, the maximum value of the peak is the melting point peak and the temperature TM of the melting point peak is the melting point peak temperature.

The above-mentioned expandability is obtained as follows:

After placing 100 to 300 cc of pre-expanded particles having a known expansion ratio in a pressure container having at least two ports for steam inlet port and steam outlet port, e.g., a pressure container of autoclave type or an in-mold foaming machine, steam is introduced from the steam inlet port for 5 seconds in the state of the steam outlet port being opened to expel the air in the container, the steam outlet port is closed and the pre-expanded particles are heated for 10 seconds by steam of the above-mentioned melting point peak temperature of base resin obtained by differential scanning calorimetry. After cooling, the pre-expanded particles are taken out, dried at 60° C. for 12 hours and treated with air pressure of 2 kg/cm²G at room temperature for 12 hours to impart an inner pressure to the pre-expanded particles. The shrunk pre-expanded particles are restored to the expansion ratio of the particles which expanded at the time of being heated by imparting an inner pressure as mentioned above. The expansion ratio at that time of the pre-expanded particles is defined as the expansion ratio of polypropylene resin pre-expanded particles after steam heating.

From the obtained expansion ratio of polypropylene resin pre-expanded particles after steam heating and the expansion ratio of polypropylene resin pre-expanded particles before steam heating, the expandability is obtained by the equation:

$$\text{Expandability} = \frac{\text{Expansion ratio of polypropylene resin pre-expanded particles after steam heating}}{\text{Expansion ratio of polypropylene resin pre-expanded particles before steam heating}}$$

The polypropylene resin in the present invention means resins containing not less than 80% by weight of units of a propylene monomer and less than 20% by weight of units of other monomers copolymerizable with the propylene monomer.

Examples of the polypropylene resin used as a base resin of the pre-expanded particles in the present invention are, for instance, propylene homopolymer, ethylene-propylene random copolymers, ethylene-propylene block copolymers, ethylene-propylene-butene random terpolymers, propylene-vinyl chloride copolymers, propylene-butene copolymers, propylene-maleic anhydride copolymers, and other known propylene-based resins. Polypropylene resins prepared by a stereospecific polymerization method are preferred. These may be used alone or in admixture thereof. Of these, particularly preferable are ethylene-propylene random copolymers and ethylene-propylene-butene random terpolymers which have a high versatility.

The above-mentioned polypropylene resins are preferred to be in a non-crosslinked state, but they may be those crosslinked by a peroxide or radiation.

The polypropylene resins may be used in the form of a blend with other thermoplastic resins admixable therewith within such a range that the properties of the polypropylene resins are not lost. Such other thermoplastic resins include, for instance, low density polyethylene, linear low density polyethylene, polystyrene, polybutene and ionomer. In general, the other thermoplastic resins compatible with the polypropylene resin are used in an amount of 5 to 20 parts by weight per 100 parts by weight of the polypropylene resin. In case of using polystyrene, it is preferable that the amount thereof is from 5 to 10 parts by weight per 100 parts by weight of the polypropylene resin.

The polypropylene resins are usually processed into a desired particulate shape so as to make it easier to use in pre-expansion, for example, by melting the resins in extruder, kneader, Banbury mixer or mixing rolls and forming into particles having a desired shape, such as column, prolate spheroid, sphere, cube or rectangular parallelopiped, and having an average particle size of 0.1 to 5 mm, preferably 0.5 to 3 mm.

The process for preparing the polypropylene resin pre-expanded particles of the present invention is not particularly limited, and known processes are applicable. For example, the pre-expanded particles of the present invention are produced by a process which comprises impregnating polypropylene resin particles with a volatile blowing agent in a pressure vessel, dispersing the particles into an aqueous dispersion medium, preferably water, with stirring, heating under pressure to a prescribed expansion temperature, and releasing the aqueous dispersion into a low pressure zone to thereby expand the particles.

The expandability of the pre-expanded particles varies depending on the molecular weight, molecular weight distribution, molecular structure, crystalline structure, amount of crystals and thermal history of the base resin, or depending on the heating temperature at the time of expanding (expansion temperature), heating pressure (expansion pressure), heating time and the like in the preparation of the pre-expanded particles. Although the expandability of the pre-expanded particles varies depending on factors such as the molecular structure of the base resin, the expandability is increased, in the above-mentioned process for preparing the pre-expanded particles, with raising the expansion temperature. The pre-expanded particles showing an expandability of 1.0 to 1.8 as defined above when heated at the melting point peak temperature can be easily obtained by setting the expansion temperature within the range of from (TM−25) to (TM+10) (° C.) wherein TM is the melting point peak temperature of a base resin, namely a polypropylene resin. When the expansion temperature is selected from the above temperature range, the expandability can be suitably selected within the above range in accordance with the kind of polypropylene resin, the amount of a volatile blowing agent, the desired expansion ratio of pre-expanded particles and the like.

Examples of the volatile blowing agent are, for instance, an aliphatic hydrocarbon such as propane, butane, isobutane, pentane or hexane; an alicyclic hydrocarbon such as cyclopentane or cyclobutane; a halogenated hydrocarbon such as trichlorotrifuoromethane, dichlorodifluoromethane, dichlorotetrafluoromethane, trichlorotrifluoroethane, methyl chloride, methylene dichloride or ethyl chloride; and the like. These blowing agents may be used alone or in admixture thereof.

The amount of the volatile blowing agent used is not particularly limited, and is suitably selected according to a desired degree of expansion of the polypropylene resin pre-expanded particles to be produced. In general, the blowing agent is used in an amount of 10 to 60 parts by weight per 100 parts by weight of the polypropylene resin particles.

In the preparation of the aqueous dispersion of polypropylene resin particles, it is preferable to use, for example, calcium tertiary phosphate, basic magnesium carbonate or calcium carbonate as a dispersing agent, and to use a small amount of a surfactant such as odium dodecylbenzenesulfonate, sodium n-paraffinsulfonate or sodium α-olefinsulfonate as a dispersing aid. The amounts of such dispersing agent and surfactant vary depending on the kinds thereof and the kind and amount of the polypropylene resin particles used. Usually the amount of the dispersing agent is from 0.2 to 3 parts by weight per 100 parts by weight of water, and the amount of the surfactant is from 0.001 to 0.1 part by weight per 100 parts by weight of water.

The amount of the polypropylene resin particles to be dispersed into an aqueous dispersion medium such as water is generally from 20 to 100 parts by weight per 100 parts by weight of the dispersion medium in order to achieve good dispersion.

Usually the polypropylene resin particles are introduced into a pressure vessel with water and a blowing agent to form an aqueous dispersion of the particles, and impregnated with the blowing agent at an elevated temperature, e.g., a temperature higher than the softening point of the polypropylene resin used. The aqueous dispersion of the particles containing the blowing agent is heated under pressure to the expansion temperature in the pressure vessel, and then released from the vessel into an atmosphere of lower pressure through an orifice having openings with a diameter of 2 to 10 mm, thereby expanding the polypropylene resin particles to give the polypropylene resin pre-expanded particles of the present invention.

As mentioned above, the heating temperature (expansion temperature) is selected within the range of (TM−25) to (TM+10)° C. according to the kind of polypropylene resin particles used and a desired value of the expandability of the polypropylene resin pre-expanded particles to be produced. On the other hand, the expansion pressure (pressure in the pressure vessel) is selected primarily according to the desired expansion ratio, and is generally from 10 to 50 kg/cm$^2$G.

There is no particular limitation in the pressure vessel used, and any vessels can be used so long as they can withstand the pressures and temperatures noted above. A representative vessel is an autoclave type pressure vessel.

A process for producing in-mold foamed articles according to the present invention will be explained below.

Molding of the pre-expanded particles of the present invention is carried out, for example, in accordance with a known in-mold foaming method as disclosed in Japanese Patent Publication Kokoku No. 51-22951 or Japanese Patent Publication Kokai No. 6-59694, by filling the polypropylene resin pre-expanded particles in a mold capable of being closed but incapable of being hermetically sealed, and heating the particles with steam or the like to fuse them together, thus giving cellular molded articles true to the mold.

In case that polypropylene resin pre-expanded particles having an expandability of 1.0 to 1.5 measured when heating at the melting point peak temperature are used in the process of the present invention for preparing in-mold foamed articles, it is preferable to provide the pre-expanded particles with a gas pressure prior to filling the particles in a mold, or to fill the pre-expanded particles in a mold in the state of being compressed at a compression rate of 10 to 60%.

Thus, the polypropylene resin pre-expanded particles having an expandability of 1.0 to 1.5 measured when heating by steam of the melting point peak temperature of the base resin can be molded by imparting a gas inner pressure to the pre-expanded particles, filling the particles in a mold capable of being closed but incapable of being hermetically sealed and heating with steam, whereby the cooling time can be shortened and cellular molded articles satisfactory in melt-adhesion of the particles and surface appearance of the molded articles can be obtained.

Prior to filling the polypropylene resin pre-expanded particles into the mold, an inner pressure based on a gas pressure can be imparted to the pre-expanded particles by holding the pre-expanded particles under pressure in an inorganic gas or the like. It is preferable from the viewpoint of the moldability in in-mold foaming of the pre-expanded particles that the inner pressure imparted to the pre-expanded particles is from 1.18 to 3.0 atms.

Examples of the inorganic gas are, for instance, air, nitrogen, helium, neon, argon or carbon dioxide gas. These may be used alone or in admixture thereof. Of these, air and nitrogen are preferable in view of versatility.

The polypropylene resin pre-expanded particles having an expandability of 1.0 to 1.5 measured when heating by steam of the melting point peak temperature of the base resin can also be molded by filling the pre-expanded particles in a mold capable of being closed but incapable of being hermetically sealed so that the compression rate of the particles is from 10 to 60% and heating with steam, whereby the cooling time can be shortened and cellular molded articles satisfactory in melt-adhesion of the particles and surface appearance of the molded articles can be obtained.

The compression rate of polypropylene resin pre-expanded particles is a value obtained by dividing a weight of the pre-expanded particles when filled under atmosphere in a mold of a molding machine by a weight of the pre-expanded particles when filled in the compressed state in the mold, and is represented by the equation:

$$\text{Compression rate} = \left(1 - \frac{\text{Weight of pre-expanded particles when filled under atmospheric pressure}}{\text{Weight of pre-expanded particles when filled in the compressed state}}\right) \times 100$$

Further, in case that polypropylene resin pre-expanded particles having an expandability of 1.5 to 1.8 measured when heating by steam of the melting point peak temperature of the base resin are used in the production of in-mold foamed articles, the pre-expanded particles are filled as they are in a mold capable of being closed but incapable of being hermetically sealed without imparting an inner pressure thereto and heated with steam to mold them, whereby cellular molded articles satisfactory in melt-adhesion of the particles and surface appearance of the molded articles can be obtained in a shortened cooling time even if the particles are filled in a mold directly without applying any inner pressure-imparting procedure.

Also, when in the above-mentioned molding processes are used polypropylene resin pre-expanded particles which show a difference of not more than 0.2 between the expandability measured when heating the particles by steam of the above-defined melting point peak temperature of base resin and the expandability measured when heating the particles by steam of "the melting point peak temperature—10° C.", not only the cooling time in molding is shortened, but also the molding time does not greatly change even if the molding conditions such as heating pressure in molding, gas pressure imparted to the particles and compression rate applied in filling the particles in a mold are changed, so in-mold foamed articles can be stably obtained.

The present invention is more specifically explained by means of examples and comparative examples, in which all parts are by weight unless otherwise noted. It is to be understood that the present invention is not limited to only these examples.

Methods of evaluation used in the examples and comparative examples are shown below.

Expansion Ratio of Pre-expanded Particles

In a 100 ml measuring cylinder, about 1 g of dried pre-expanded particles were immersed in ethanol and the volume of the particles was measured by increase of volume. The expansion ratio was calculated according to the following equation.

$$\text{Expansion ratio of pre-expanded particles} = \frac{\text{Density of polypropylene resin}}{\text{Density of polypropylene resin pre-expanded particles}} = \frac{\text{Volume of pre-expanded particles (ml)} \times \text{Density of polypropylene resin (about 0.90 g/ml)}}{\text{Weight of pre-expanded particles (g)}}$$

Bulk Density

Dried pre-expanded particles were filled in a container having a volume of about 5 liters, and the weight of the particles filled was measured. The bulk density was calculated according to the following equation:

$$\text{Bulk density} = \frac{\text{Weight of pre-expanded particles (g)}}{\text{Volume of the container (liter)}}$$

Expandability of Pre-expanded Particles

In a wire net basket were placed 200 ml of obtained pre-expanded particles, and the particles were placed with the basket in a 5 liter autoclave type pressure container having a steam inlet port and a steam outlet port. From the steam inlet port, steam of 1.0 kg/cm$^2$G was passed through the container for 5 seconds in the state of the steam outlet port being opened in order to expel the air in the container. The steam outlet port was then closed and the particles were heated by steam of 3.4 kg/cm$^2$G (about 146.5° C.) for 10 seconds. The steam outlet port was then opened, and the pre-expanded particles were cooled until the inner pressure of the container became 0 kg/cm$^2$G and taken out of the container. After drying the pre-expanded particles at 60° C. for 12 hours, the particles were held at room temperature in air of 2.0 kg/cm$^2$G to impart an inner pressure thereto, thereby restoring the particles from shrinking. The expansion ratio of the pre-expanded particles after steam heating which were restored from shrinking was obtained. The expandability was calculated according to the following equation:

$$\text{Expandability} = \frac{\text{Expansion ratio of polypropylene resin pre-expanded particles after steam heating}}{\text{Expansion ratio of polypropylene resin pre-expanded particles before steam heating}}$$

Cooling Time

In molding of pre-expanded particles in a mold, after the team heating was finished, the time (in seconds) required for the pressure of the molded article surface against the mold surface (molded article surface pressure) to decrease to 0.3 kg/cm$^2$G was measured.

Density of Molded Article

The length, width, thickness and weight of a molded article were measured, and the density was calculated according to the following equation:

$$\text{Density of molded article (g/liter)} = \frac{\text{Weight of molded article (g)}}{\text{Volume of molded article (liter)}} = \frac{\text{Weight of molded article (g)} \times 10^6}{\text{Lenght (mm)} \times \text{Width (mm)} \times \text{thickness (mm) of molded article}}$$

Melt Adhesion

After forming a notch with a knife in the surface of a molded article to a depth of approximately 5 mm, the molded article was split along the line of the notch by bending the molded article. The broken surface was observed and the percentage of broken particles to the whole particles was obtained. Evaluation was made according to the following criteria. A melt adhesion rate of at least 60% is usually satisfactory for molded articles.

⊚: Melt adhesion rate of at least 80%
○: Melt adhesion rate of 60% to less than 80%
Δ: Melt adhesion rate of 50% to less than 60%
X: Melt adhesion rate of less than 50%

Surface Appearance

The surface of a molded article was visually observed and evaluated according to the following criteria.

⊚: There is no irregularity in the surface and there is little gap between particles.
○: There is no irregularity in the surface, but there are slight gaps between particles.
Δ: There is no irregularity in the surface, but there are conspicuous gaps between particles.
X: There is an irregularity in the surface, and gaps between respective particles are very large.

EXAMPLES 1 TO 3 AND COMPARATIVE EXAMPLES 1 AND 2

Preparation of Polypropylene Resin Pre-expanded Particles

A pressure vessel was charged with 100 parts of pellets of a base resin (ethylene-propylene random copolymer) A shown in Table 1 (base resin A having an ethylene content of 2.1% by weight, a melt flow index MI of 7 g/ 10 minutes, a weight of about 1.8 mg per a pellet and a melting point peak temperature of 146.5° C. measured by DSC), isobutane of an amount shown in Table 2 and, as a dispersing agent, 2.0 parts of powdery basic calcium tertiary phosphate and 0.03 part of sodium n-paraffinsulfonate, and 300 parts of water. The resulting aqueous dispersion was heated to a heating temperature shown in Table 2. The pressure inside the vessel at that time was about 16.0 kg/cm$^2$G.

The pressure inside the vessel was then adjusted to a prescribed expansion pressure of 17.0 kg/cm$^2$G by introducing isobutane to the vessel. Once the prescribed expansion pressure was reached, a valve provided at a lower part of the pressure vessel was opened and, while maintaining the pressure inside the vessel at that pressure, the aqueous The results are shown in Table 2.

TABLE 1

| Base resin (ethylene-propylene random copolymer) | Melting point peak temperature (° C.) | Ethylene content (% by weight) |
|---|---|---|
| A | 146.5 | 2.1 |
| B | 144.0 | 3.2 |
| C | 145.4 | 3.9 |
| D | 141.0 | 3.9 |
| E | 143.0 | 3.5 |
| F | 138.0 | 4.6 |

TABLE 2

| | | Preparation conditions | | | | Results of evaluation | | |
|---|---|---|---|---|---|---|---|---|
| | Pre-expanded particles | Kind of base resin | Amount of isobutane charged (part) | Heating temperature (° C.) | Expansion ratio | Bulk density (g/liter) | Expandability at melting point peak temperature (A) | Expandability at "melting point peak temperature −10° C." (B) | Difference in expandability (A–B) |
| Com. Ex. 1 | 1 | A | 12.0 | 143.4 | 19.3 | 29.3 | 2.33 | 1.75 | 0.58 |
| Com. Ex. 2 | 2 | A | 12.0 | 141.0 | 19.0 | 29.7 | 1.87 | 1.50 | 0.37 |
| Ex. 1 | 3 | A | 15.0 | 138.9 | 18.5 | 29.8 | 1.38 | 1.28 | 0.10 |
| Ex. 2 | 4 | A | 15.0 | 136.3 | 19.3 | 29.2 | 1.17 | 1.10 | 0.07 |
| Ex. 3 | 5 | A | 15.0 | 131.0 | 19.2 | 29.6 | 1.01 | 0.98 | 0.03 |
| Com. Ex. 3 | 6 | B | 10.0 | 143.0 | 19.0 | 27.0 | 1.90 | 1.34 | 0.56 |
| Ex. 4 | 7 | B | 10.0 | 141.5 | 18.8 | 27.8 | 1.27 | 1.14 | 0.13 |
| Ex. 5 | 8 | C | 6.5 | 142.5 | 10.0 | 49.4 | 1.45 | 1.23 | 0.22 |
| Com. Ex. 4 | 9 | C | 6.5 | 144.5 | 10.2 | 48.4 | 1.83 | 1.55 | 0.28 |
| Ex. 6 | 10 | C | 6.5 | 143.4 | 8.7 | 57.0 | 1.62 | 1.35 | 0.27 |
| Com. Ex. 5 | 11 | C | 6.5 | 145.0 | 8.5 | 57.5 | 2.24 | 1.75 | 0.49 |
| Com. Ex. 6 | 12 | C | 23.0 | 138.0 | 32.1 | 16.3 | 1.83 | 1.54 | 0.29 |
| Ex. 7 | 13 | C | 23.0 | 136.1 | 32.4 | 15.9 | 1.50 | 1.27 | 0.23 |
| Ex. 8 | 14 | C | 23.0 | 134.6 | 31.9 | 16.5 | 1.24 | 1.15 | 0.09 |
| Ex. 9 | 15 | D | 10.5 | 140.3 | 21.0 | 24.7 | 1.27 | 1.05 | 0.22 |
| Ex. 10 | 16 | E | 10.5 | 142.1 | 20.3 | 25.6 | 1.40 | 1.10 | 0.30 |
| Ex. 11 | 17 | B | 10.5 | 143.0 | 20.9 | 25.4 | 1.64 | 1.24 | 0.40 |
| Com. Ex. 7 | 18 | F | 10.5 | 138.0 | 19.4 | 25.1 | 1.81 | 1.25 | 0.56 | dispersion was released into atmospheric pressure through an orifice plate having openings therein of 4.4 mm diameter, thereby performing expansion to give pre-expanded particles 1 to 5.

The properties such as expansion ratio and expandability of the obtained pre-expanded particles are shown in Table 2. The expansion ratio of pre-expanded particles when heated by steam of the melting point peak temperature of the base resin can be obtained by the equation of (expansion ratio)× (expandability at melting point peak temperature). For example, in case of Comparative Example 1, the expansion ratio at the melting point peak temperature was 45.0 times.

EXAMPLES 4 TO 11 AND COMPARATIVE EXAMPLES 3 TO 7

Pre-expanded particles 6 to 18 were prepared in the same manner as in Example 1 except that ethylene-propylene random copolymers B to F shown in Table 1 were used and the preparation was carried out under the conditions shown in Table 2. The properties thereof such as expansion ratio, bulk density and expandability at the melting point peak temperature were evaluated according to the above-mentioned methods.

EXAMPLE 12

The pre-expanded particles 3 obtained in Example 1 were placed in a pressure vessel and compressed by air pressure, and the compressed particles were filled in a block mold having a size of 320×320×60 mm at a compression rate of 36%.

Air in the mold was then expelled by steam of 1.0 kg/cm$^2$G, and in-mold foaming was carried out by heating with steam of 3.3 kg/cm$^2$G to give an in-mold foamed article having no problem in surface appearance. The cooling time at that time was 80 seconds.

The obtained in-mold foamed article was evaluated according to the above-mentioned methods with respect to density of foamed article, melt adhesion and surface appearance.

The results are shown in Table 3.

EXAMPLES 13 TO 29 AND COMPARATIVE EXAMPLES 8 TO 21

In-mold foamed articles were prepared in the same manner as in Example 12 except that the molding was carried out under the conditions shown in Tables 3 to 5, and were evaluated in the same manner.

The results are shown in Tables 3 to 5.

TABLE 3

| | Molding conditions | | | | Results of evaluation | | | |
|---|---|---|---|---|---|---|---|---|
| | Kind of base resin | Kind of pre-expanded particles | Compression rate (%) | Heating pressure (kg/cm² G) | Cooling time (sec.) | Density of molded article (g/liter) | Melt adhesion | Surface appearance |
| Ex. 12 | A | 3 | 36 | 3.3 | 80 | 50 | ◉ | ◉ |
| Ex. 13 | A | 3 | 36 | 3.5 | 85 | 50 | ◉ | ◉ |
| Ex. 14 | A | 3 | 36 | 3.7 | 90 | 50 | ◉ | ◉ |
| Ex. 15 | A | 4 | 38 | 3.8 | 70 | 50 | ○ | ○ |
| Ex. 16 | A | 4 | 38 | 4.0 | 75 | 50 | ◉ | ◉ |
| Ex. 17 | A | 4 | 38 | 4.2 | 85 | 50 | ◉ | ◉ |
| Ex. 18 | A | 5 | 37 | 4.2 | 25 | 50 | ○ | ○ |
| Ex. 19 | A | 5 | 37 | 4.5 | 20 | 50 | ◉ | ◉ |
| Ex. 20 | B | 7 | 32 | 3.2 | 33 | 46 | ◉ | ◉ |
| Ex. 21 | B | 7 | 43 | 3.2 | 53 | 54 | ◉ | ◉ |
| Ex. 22 | B | 7 | 36 | 3.5 | 49 | 49 | ◉ | ◉ |
| Ex. 23 | B | 7 | 43 | 3.5 | 55 | 54 | ◉ | ◉ |
| Com. Ex. 8 | A | 1 | 37 | 2.6 | 132 | 50 | ◉ | ◉ |
| Com. Ex. 9 | A | 1 | 37 | 2.8 | 165 | 50 | ◉ | ◉ |
| Com. Ex. 10 | A | 1 | 37 | 3.0 | 205 | 50 | ◉ | ◉ |
| Com. Ex. 11 | A | 2 | 37 | 2.8 | 125 | 50 | ◉ | ◉ |
| Com. Ex. 12 | A | 2 | 37 | 3.0 | 130 | 50 | ◉ | ◉ |
| Com. Ex. 13 | A | 2 | 37 | 3.3 | 140 | 50 | ◉ | ◉ |
| Com. Ex. 14 | B | 6 | 28 | 2.9 | 83 | 40 | ◉ | ◉ |
| Com. Ex. 15 | B | 6 | 44 | 2.9 | 184 | 51 | ◉ | ◉ |
| Com. Ex. 16 | B | 6 | 25 | 3.2 | 89 | 39 | ◉ | ◉ |
| Com. Ex. 17 | B | 6 | 45 | 3.2 | 211 | 51 | ◉ | ◉ |

TABLE 4

| | Molding conditions | | | | Results of evaluation | | | |
|---|---|---|---|---|---|---|---|---|
| | Kind of base resin | Kind of pre-expanded particles | Compression rate (%) | Heating pressure (kg/cm² G) | Cooling time (sec.) | Density of molded article (g/liter) | Melt adhesion | Surface appearance |
| Ex. 24 | C | 8 | 29 | 3.4 | 16 | 75 | ◉ | ○ |
| Ex. 25 | C | 10 | 23 | 3.4 | 17 | 80 | ◉ | ○ |
| Com. Ex. 18 | C | 9 | 31 | 3.4 | 48 | 75 | ◉ | ◉ |
| Com. Ex. 19 | C | 11 | 23 | 3.4 | 65 | 80 | ◉ | ◉ |

TABLE 5

| | Molding conditions | | | | Results of evaluation | | | |
|---|---|---|---|---|---|---|---|---|
| | Kind of base resin | Kind of pre-expanded particles | Compression rate (%) | Heating pressure (kg/cm² G) | Cooling time (sec.) | Density of molded article (g/liter) | Melt adhesion | Surface appearance |
| Ex. 26 | C | 13 | 29 | 3.3 | 25 | 25 | ◉ | ◉ |
| Ex. 27 | C | 13 | 40 | 3.3 | 53 | 30 | ◉ | ◉ |
| Ex. 28 | C | 14 | 30 | 3.3 | 20 | 25 | ◉ | ◉ |
| Ex. 29 | C | 14 | 42 | 3.3 | 48 | 30 | ◉ | ◉ |
| Com. Ex. 20 | C | 12 | 28 | 3.3 | 80 | 25 | ◉ | ◉ |
| Com. Ex. 21 | C | 12 | 40 | 3.3 | 130 | 30 | ◉ | ◉ |

From the above Tables, it is found that in case of using polypropylene resin pre-expanded particles having approximately identical bulk density in in-mold foaming, the lower the expandability, the more the cooling time is shortened.

EXAMPLE 30

The pre-expanded particles 13 obtained in Example 7 were placed in a pressure vessel, held at 25° under an air pressure of 2.5 kg/cm$^2$G for 16 hours and then allowed to stand under atmospheric pressure for 60 to 90 minutes to adjust the internal pressure of the particles to 1.45 atms. The particles were then filled in a block mold having a size of 320×320×60 mm.

Air in the mold was then expelled by steam of 1.0 kg/cm$^2$G, and in-mold foaming was carried out by heating with steam of 3.0 kg/cm$^2$G to give an in-mold foamed article having no problem in surface appearance. The cooling time at that time was 15 seconds.

The obtained in-mold foamed article was evaluated according to the above-mentioned methods with respect to density of foamed article, melt adhesion and surface appearance.

The results are shown in Table 6.

EXAMPLES 31 TO 33 AND COMPARATIVE EXAMPLES 22 TO 23

In-mold foamed articles were prepared in the same manner as in Example 30 except that the molding was carried out under the conditions shown in Table 6, and were evaluated in the same manner.

The results are shown in Table 6.

EXAMPLE 34

The pre-expanded particles 15 obtained in Example 9 were filled in a block mold having a size of 320×320×60 mm without imparting an inner pressure to the particles.

Air in the mold was then expelled by steam of 1.0 kg/cm$^2$G, and in-mold foaming was carried out by heating with steam of 3.0 kg/cm$^2$G to give an in-mold foamed article having no problem in surface appearance. The cooling time at that time was 25 seconds.

The obtained in-mold foamed article was evaluated according to the above-mentioned methods with respect to density of foamed article, melt adhesion and surface appearance.

The results are shown in Table 7.

EXAMPLES 35 TO 40 AND COMPARATIVE EXAMPLES 24 TO 25

In-mold foamed articles were prepared in the same manner as in Example 34 except that the molding was carried out under the conditions shown in Table 7, and were evaluated in the same manner.

The results are shown in Table 7.

TABLE 6

| | Molding conditions | | | | Results of evaluation | | |
|---|---|---|---|---|---|---|---|
| | Kind of base resin | Kind of pre-expanded particles | Inner pressure of pre-expanded particles (atm) | Heating pressure (kg/cm$^2$ G) | Cooling time (sec.) | Density of molded article (g/liter) | Melt adhesion | Surface appearance |
| Ex. 30 | C | 13 | 1.45 | 3.0 | 15 | 20 | ◉ | ◉ |
| Ex. 31 | C | 13 | 1.45 | 3.3 | 23 | 20 | ◉ | ◉ |
| Ex. 32 | C | 14 | 1.45 | 3.0 | 12 | 20 | ◉ | ◉ |
| Ex. 33 | C | 14 | 1.45 | 3.3 | 17 | 20 | ◉ | ◉ |
| Com. Ex. 22 | C | 12 | 1.45 | 3.0 | 70 | 20 | ◉ | ◉ |
| Com. Ex. 23 | C | 12 | 1.45 | 3.3 | 75 | 20 | ◉ | ◉ |

TABLE 7

| | Molding conditions | | | Results of evaluation | | | |
|---|---|---|---|---|---|---|---|
| | Kind of base resin | Kind of pre-expanded particles | Heating pressure (kg/cm$^2$ G) | Cooling time (sec.) | Density of molded article (g/liter) | Melt adhesion | Surface appearance |
| Ex. 34 | D | 15 | 3.0 | 25 | 36 | ◉ | ◉ |
| Ex. 35 | D | 15 | 3.3 | 35 | 36 | ◉ | ◉ |
| Ex. 36 | E | 16 | 2.5 | 18 | 36 | ○ | ◉ |

TABLE 7-continued

|  | Molding conditions | | | Results of evaluation | | |
|---|---|---|---|---|---|---|
|  | Kind of base resin | Kind of pre-expanded particles | Heating pressure (kg/cm² G) | Cooling time (sec.) | Density of molded article (g/liter) | Melt adhesion | Surface appearance |
| Ex. 37 | E | 16 | 3.0 | 35 | 36 | ⊙ | ⊙ |
| Ex. 38 | E | 16 | 3.3 | 40 | 36 | ⊙ | ⊙ |
| Ex. 39 | B | 17 | 2.5 | 30 | 36 | ⊙ | ⊙ |
| Ex. 40 | B | 17 | 2.8 | 47 | 36 | ⊙ | ⊙ |
| Com. Ex. 24 | F | 18 | 2.2 | 70 | 36 | ⊙ | ⊙ |
| Com. Ex. 25 | F | 18 | 2.5 | 97 | 36 | ⊙ | ⊙ |

INDUSTRIAL APPLICABILITY

When the polypropylene resin pre-expanded particles of the present invention, the expandability of which measured when heated by steam of the melting point peak temperature of the base resin thereof is adjusted within a specific range, are used in in-mold foaming, the cooling time can be shortened and in-mold foamed articles having good melt-adhesion of the particles to each other and good surface appearance and having a uniform density extending from the surface to the inner portion can be stably obtained. Also, when a difference between the expandability when heated by steam of the melting point peak temperature and the expandability when heated by steam of "the melting point peak temperature—10° C." is adjusted to not more than a specific range, the cooling time can be shortened stably even if the molding conditions such as heating pressure of in-mold foaming are changed. Further, the pre-expanded particles of the present invention can be suitably used in various in-mold foaming methods.

What is claimed is:

1. A process for preparing cellular moldings of a polypropylene resin from pre-expanded particles comprising the steps of imparting an inner pressure to polypropylene resin pre-expanded particles having an expandability of 1.0 to 1.5, filling said pre-expanded particles in a mold capable of being closed but incapable of being hermetically sealed, and heating said particles to fuse together, said expandability being represented by the equation:

$$\text{Expandability} = \frac{\text{Expansion ratio of polypropylene resin pre-expanded particle after steam heating}}{\text{Expansion ratio of polypropylene resin pre-expanded particle before steam heating}}$$

wherein the expandability is measured by subjecting the pre-expanded particle to the steam heating without imparting an inner pressure thereto, said steam has a temperature equal to the melting point peak temperature of said polypropylene resin measured by differential scanning calorimetry under the conditions that 1 to 10 mg of the pre-expanded particles is heated to 210° C. at a rate of 10° C./minute, then cooled to 40° C. at a rate of 10° C./minute and heated again to 210° C. at a rate of 10° C./minute, and said expansion ratio of polypropylene resin pre-expanded particle after steam heating denotes the value measured after the restoration from shrinking by impregnating the pre-expanded particle with air.

2. A process for preparing cellular moldings of a polypropylene resin from pre-expanded particles comprising the steps of filling polypropylene resin pre-expanded particles having an expandability of 1.0 to 1.5 in a mold capable of being closed but incapable of being hermetically sealed in the state of being compressed at a compression rate of 10 to 60%, and heating said particles to fuse together, said expandability being represented by the equation:

$$\text{Expandability} = \frac{\text{Expansion ratio of polypropylene resin pre-expanded particle after steam heating}}{\text{Expansion ratio of polypropylene resin pre-expanded particle before steam heating}}$$

wherein the expandability is measured by subjecting the pre-expanded particle to the steam heating without imparting an inner pressure thereto, said steam has a temperature equal to the melting point peak temperature of said polypropylene resin measured by differential scanning calorimetry under the conditions that 1 to 10 mg of the pre-expanded particles is heated to 210° C. at a rate of 10° C./minute, then cooled to 40° C. at a rate of 10° C./minute and heated again to 210° C. at a rate of 10° C./minute, and said expansion ratio of polypropylene resin pre-expanded particle after steam heating denotes the value measured after the restoration from shrinking by impregnating the pre-expanded particle with air.

3. A process for preparing cellular moldings of a polypropylene resin comprising the steps of filling polypropylene resin pre-expanded particles having an expandability of 1.5 to 1.8 in a mold capable of being closed but incapable of being hermetically sealed, without applying an inner pressure-imparting procedure to said pre-expanded particles, and heating said particles to fuse together, said expandability being represented by the equation:

$$\text{Expandability} = \frac{\text{Expansion ratio of polypropylene resin pre-expanded particle after steam heating}}{\text{Expansion ratio of polypropylene resin pre-expanded particle before steam heating}}$$

wherein the expandability is measured by subjecting the pre-expanded particle to the steam heating without imparting an inner pressure thereto, said steam has a temperature equal to the melting point peak temperature of said polypropylene resin measured by differential scanning calorimetry under the conditions that 1 to 10 mg of the pre-expanded particles is heated to 210° C. at a rate of 10° minute, then cooled to 40° C. at a rate of 10° C./minute and heated again to 210° C. at a rate of 10° C./minute, and said expansion ratio of polypropylene resin pre-expanded particle after steam heating denotes the value measured after the restoration from shrinking by impregnating the pre-expanded particle with air.

4. A process for preparing cellular moldings of a polypropylene resin comprising the steps of filling polypropylene resin pre-expanded particles having an expandability of 1.0 to 1.8 in a mold capable of being closed but incapable of being hermetically sealed, and heating said particles to fuse together, said expandability being represented by the equation:

$$\text{Expandability} = \frac{\text{Expansion ratio of polypropylene resin pre-expanded particle after steam heating}}{\text{Expansion ratio of polypropylene resin pre-expanded particle before steam heating}}$$

wherein the expandability is measured by subjecting said pre-expanded particle to said steam heating without imparting an inner pressure thereto, said steam has a temperature equal to the melting point peak temperature of said polypropylene resin measured by differential scanning calorimetry under the conditions that 1 to 10 mg of the pre-expanded particles is heated to 210° C. at a rate of 10° C./minute, then cooled to 40° C. at a rate of 10° C./minute and heated again to 210° C. at a rate of 10° C./minute, and said expansion ratio of polypropylene resin pre-expanded particle after steam heating denotes the value measured after the restoration from shrinking by impregnating the pre-expanded particle with air.

* * * * *